US012658544B2

(12) United States Patent
Tamiazzo

(10) Patent No.: US 12,658,544 B2
(45) Date of Patent: Jun. 16, 2026

(54) FILTERS INCLUDING DETUNED BOX SECTION RESONATOR CONFIGURATIONS AND/OR RESONATORS HAVING BEVELED TOP SURFACES

(71) Applicant: CommScope Italy S.r.l., Agrate Brianza (IT)

(72) Inventor: Stefano Tamiazzo, Agrate Brianza (IT)

(73) Assignee: CommScope Italy S.r.l., Agrate Brianza (IT)

( * ) Notice: Subject to any disclaimer, the term of this patent is extended or adjusted under 35 U.S.C. 154(b) by 230 days.

(21) Appl. No.: 18/708,547

(22) PCT Filed: Oct. 19, 2022

(86) PCT No.: PCT/EP2022/079100
§ 371 (c)(1),
(2) Date: May 8, 2024

(87) PCT Pub. No.: WO2023/110193
PCT Pub. Date: Jun. 22, 2023

(65) Prior Publication Data

US 2025/0023220 A1 Jan. 16, 2025

(30) Foreign Application Priority Data

Dec. 17, 2021 (IT) ........................ 102021000031622

(51) Int. Cl.
*H01P 1/208* (2006.01)
*H01P 1/201* (2006.01)
(Continued)

(52) U.S. Cl.
CPC .............. *H01P 1/207* (2013.01); *H01P 1/201* (2013.01); *H01P 1/2082* (2013.01); *H01P 7/06* (2013.01)

(58) Field of Classification Search
CPC .. H01P 1/20; H01P 1/201; H01P 1/202; H01P 1/205; H01P 1/2053; H01P 1/207;
(Continued)

(56) References Cited

U.S. PATENT DOCUMENTS 11,158,918 B2 10/2021 Li et al.
2017/0033424 A1* 2/2017 Kwak .................. H01P 1/2086
(Continued)

FOREIGN PATENT DOCUMENTS

EP 0580193 A2 1/1994
EP 3709434 A1 9/2020
(Continued)

OTHER PUBLICATIONS

"International Search Report and Written Opinion of the International Searching Authority", International Application No. PCT/US2022/079100, Jan. 18, 2023, 19 pp.
(Continued)

*Primary Examiner* — Stephen E. Jones
(74) *Attorney, Agent, or Firm* — Myers Bigel, P.A.

(57) ABSTRACT

Filters include a housing and at least first through fourth resonators are mounted within the housing. The first resonator is configured to couple with the second resonator and the third resonator but not the fourth resonator. The second resonator is configured to couple with the first resonator and the fourth resonator but not the third resonator. The third resonator is configured to couple with the first resonator and the fourth resonator but not the second resonator. The fourth resonator is configured to couple with the second resonator and the third resonator but not the first resonator. The first, second and fourth resonators are configured to resonate within a passband of the filter, while the third resonator is configured to resonate outside the passband of the filter.

20 Claims, 6 Drawing Sheets

(51) Int. Cl.
*H01P 1/207* (2006.01)
*H01P 7/06* (2006.01)

(58) Field of Classification Search
CPC ...... H01P 1/208; H01P 1/2082; H01P 1/2084; H01P 1/2086
USPC ........................................................ 333/202
See application file for complete search history.

(56) References Cited

U.S. PATENT DOCUMENTS

| | | | | |
|---|---|---|---|---|
| 2017/0141446 | A1 | 5/2017 | Tkadlec et al. | |
| 2021/0336313 | A1 | 10/2021 | Park et al. | |
| 2023/0138279 | A1* | 5/2023 | Lee | H01P 1/205 716/110 |

FOREIGN PATENT DOCUMENTS

| | | | |
|---|---|---|---|
| EP | 3849011 | A1 | 7/2021 |
| KR | 20090021773 | A | 3/2009 |

OTHER PUBLICATIONS

Cameron, Richard J., et al., "Synthesis of Advanced Microwave Filters Without Diagonal Cross-Couplings", IEEE Transactions On Microwave Theory and Techniques, vol. 50, No. 12, Dec. 2002, pp. 2862-2872.

Lin, Wentao , et al., "Tunable Bandpass Filters with One Switchable Transmission Zero by Only Tuning Resonances", IEEE Microwave and Wireless Components Letters, vol. 31, No. 2, Feb. 2021, pp. 105-108.

* cited by examiner

FILTERS INCLUDING DETUNED BOX SECTION RESONATOR CONFIGURATIONS AND/OR RESONATORS HAVING BEVELED TOP SURFACES

CROSS-REFERENCE TO RELATED APPLICATIONS

The present application is a 35 U.S.C. § 371 national stage application of PCT Application No. PCT/EP2022/079100, filed on Oct. 19, 2022, which itself claims priority to Italian Patent Application No. 102021000031622, filed Dec. 17, 2021, the entire contents of both of which are incorporated herein by reference as if set forth fully herein.

BACKGROUND

The present invention relates generally to communications systems and, more particularly, to radio frequency ("RF") filters that are suitable for use in cellular communications systems.

Filters are electronic devices that selectively pass signals based on the frequency of the signal. Various types of filters are used in cellular communications systems. As new generations of cellular communications services have been introduced, both the number and types of filters that are used has expanded significantly. Filters may be used, for example, to allow RF signals in different frequency bands to share selected components of a cellular communications system, to reduce interference along RF transmission paths, and/or to separate RF data signals from power and/or control signals. In many applications, filters may be incorporated within a base station antenna. As the number of filters used in a typical cellular communications system has proliferated, the need for smaller, lighter and/or less expensive filters has increased.

The "frequency response" of a filter refers to the amount of energy that passes from a first port (e.g., an input port) of the filter to a second port (e.g., an output port) of the filter as a function of frequency. The frequency response for a filter will typically include one or more passbands, which are frequency ranges where the filter passes signals with relatively small amounts of attenuation. A filter response also typically includes one or more stopbands. A stopband refers to a frequency range where the filter will substantially not pass signals, usually because the filter is designed to reflect backwards any signals that are incident on the filter in the stopband frequency range. In some applications, it may be desirable that the filter response a high degree of "local selectivity," meaning that the transition from a passband to an adjacent stopband occurs over a narrow frequency range. Metal resonant cavity filters are typically used in applications where the filter response must exhibit a high degree of local selectivity. One technique for enhancing local selectivity is to add transmission zeros in the filter response. A "transmission zero" refers to a portion of a filter frequency response where the amount of signal energy that passes is very low.

Resonant cavity filters generate a selective response by passing an input RF signal by a series of resonators that are interconnected by suitable coupling elements such as coupling windows and/or transmission lines. The RF energy passes by the resonators along a main transmission path. Additional selectivity in the form of transmission zeros can be introduced locally, at certain specific frequencies, by means of cross couplings, which refer to couplings between non-adjacent resonators along the main transmission path.

The cross couplings may be positive or negative cross-couplings, depending on the desired location of the transmission zero with respect to the passband response of the filter.

It can be particularly challenging to generate transmission zeros below the passband since this usually requires the introduction of negative cross couplings. Such negative cross couplings are usually realized through additional electrically-floating metal parts. These metal parts may significantly increase the complexity of the filter. Moreover, in smaller filters that operate at higher frequencies, assembly tolerances for the electrically floating metal parts that generate the negative cross couplings may be challenging, and the additional metal parts can generate spurious resonances that may degrade performance.

FIG. 1 is a schematic drawing that illustrates one conventional mechanism for generating a transmission zero below the passband of a bandpass filter 1. As shown in FIG. 1, three resonant cavities 10-1 through 10-3 are disposed in a triangular arrangement. Each resonant cavity 10-1 through 10-3 includes a respective resonator 12-1 through 12-3 disposed therein. A resonant cavity 10 and its associated resonator 12 are often referred to collectively as a "node" or as a "resonant node." Nodes tend to impart a −90° phase shift to RF signals that are at frequencies below the resonant frequency of the node, and to impart a +90° phase shift for RF signals at frequencies that are above the resonant frequency of the node.

As shown in FIG. 1, resonant cavity 10-1 is coupled to resonant cavity 10-2 through a first positive coupling 14-1, and resonant cavity 10-2 is coupled to resonant cavity 10-3 through a second positive coupling 14-2. Positive couplings have a transmission phase of +90°, as shown in FIG. 1. Resonant cavity 10-1 is coupled to resonant cavity 10-3 through a negative cross coupling 16. Negative couplings have a transmission phase of −90°, as is also shown in FIG. 1. The first and second positive couplings provide a first transmission path between resonant cavity 10-1 and resonant cavity 10-3, and the negative cross coupling 16 provides a second transmission path between resonant cavity 10-1 and resonant cavity 10-3.

The desired transmission zero will be located just below the lower edge of the passband of filter 1. As such, in the frequency range where the transmission zero is to be generated, nodes having resonators with resonant frequencies within the passband will generate −90° phase shifts, whereas nodes having resonators with resonant frequencies well below the passband (and hence below where the transmission zero will be located) will generate +90° phase shifts. In the filter design shown in FIG. 1, all three resonators 12-1 through 12-3 are designed to have resonant frequencies that are within the passband of the filter 1. As such, resonant cavity 10-2 will impart a phase shift of −90° for RF signals having frequencies below the passband.

Based on the above, it can be seen that the phase shift for RF signals in the frequency range where the transmission zero is to be generated that travel along the first transmission path is 90°+(−90°)+90°=90°. The phase shift for RF signals in the frequency range where the transmission zero is to be generated that travel along the second transmission path is −90°. As such, the two transmission paths connecting resonant cavity 10-1 to resonant cavity 10-3 are out of phase by 180° and hence, for equal magnitude couplings along the two paths, a transmission zero must be generated at some frequency.

FIG. 2 is a graph illustrating the frequency response (curve 20) and return loss (curve 22) of the filter 1 that includes three resonators having the configuration shown in FIG. 1. The vertical axis in FIG. 2 shows the RF signal level at the output of the filter 1 relative to the RF signal level at the input to the filter 1 in dB. As shown in FIG. 2, the filter 1 has a passband extending from 3400 MHz to 3600 MHz, has a maximum return loss of −18 dB, and a transmission zero is generated at 3331 MHz that provides the sharp response at the lower edge of the passband.

SUMMARY

Pursuant to embodiments of the present invention, filters are provided that include a housing having an input port and an output port and first through fourth resonators mounted within the housing. The first resonator is configured to couple with the second resonator and the third resonator but not the fourth resonator, the second resonator is configured to couple with the first resonator and the fourth resonator but not the third resonator, the third resonator is configured to couple with the first resonator and the fourth resonator but not the second resonator, and the fourth resonator is configured to couple with the second resonator and the third resonator but not the first resonator. In these filters, the first resonator, the second resonator and the fourth resonator are configured to resonate within a passband of the filter, while the third resonator is configured to resonate outside the passband of the filter.

In some embodiments, the third resonator may be configured to resonate below the passband of the filter.

In some embodiments, the filter may further comprise at least one wall that extends from a floor of the housing that is interposed along a first axis that extends through the first resonator and the fourth resonator.

In some embodiments, the at least one wall may be a single post-shaped wall. In some embodiments, the post-shaped wall may be also interposed along a second axis that extends through the second resonator and the third resonator.

In some embodiments, the first through fourth resonators may be arranged in a box section configuration.

In some embodiments, there may be no negative cross couplings between any pair of the first through fourth resonators.

In some embodiments, the third resonator may extend further upwardly from a floor of the housing than do any of the first second resonator or fourth resonators.]

In some embodiments, the passband of the filter may include at least some frequencies within the 3.4-3.8 GHz frequency range.

In some embodiments, the filter may further comprise a transmission line that extends from an input to the filter to an output of the filter, where the transmission line includes a first branch that connects the first resonator to the second resonator and the second resonator to the fourth resonator and a second branch that connects the first resonator to the third resonator and the third resonator to the fourth resonator.

In some embodiments, the transmission line may be a stripline transmission line.

In some embodiments, a magnitude of a first coupling between the first resonant cavity and the third resonant cavity is not equal to a magnitude of a second coupling between the third resonant cavity and the fourth resonant cavity.

In some embodiments, the magnitude of the first coupling may exceed the magnitude of the second coupling. For example, the magnitude of the first coupling may be at least twice the magnitude of the second coupling.

In some embodiments, the filter may include a plurality of additional resonators that extend upwardly from a floor of the housing, and a top surface of a first of the additional resonators may include a beveled surface.

In some embodiments, the filter further includes a cover having a bendable tuning stub formed therein, where the bendable tuning stub is positioned so that when the bendable tuning stub is bent at an angle with respect to a plane defined by the cover that corresponds to an angle of the beveled surface of the first of the additional resonators with respect to a plane defined by the cover, the beveled surface and the bendable tuning stub form a parallel plate capacitor.

Pursuant to further embodiments of the present invention, filters are provided that include a housing having an input port and an output port, first through fourth resonators mounted within the housing to extend upwardly from a floor of the housing, a first transmission line branch that connects the first resonator to the second resonator and the second resonator to the fourth resonator, and a second transmission line branch that connects the first resonator to the third resonator and the third resonator to the fourth resonator. The first and second transmission line branches form a closed structure when viewed from above, and the first resonator, the second resonator and the fourth resonator are configured to resonate within a passband of the filter, while the third resonator is configured to resonate outside the passband of the filter.

In some embodiments, the third resonator may be configured to resonate below the passband of the filter.

In some embodiments, the first through fourth resonators may define a box when viewed from above.

In some embodiments, the filter may further comprise a wall that extends upwardly from the floor of the housing, the wall being within the box defined by the first through fourth resonators. In some embodiments, the wall may be comprise a post-shaped wall.

In some embodiments, there are no negative cross couplings between any pair of the first through fourth resonators.

In some embodiments, the third resonator may extend further upwardly from the floor of the housing than do any of the first, second resonator or fourth resonators.

In some embodiments, the first transmission line section and the second transmission line section may each be stripline transmission line sections.

In some embodiments, the filter may include a plurality of additional resonators that extend upwardly from the floor of the housing, and a top surface of a first of the additional resonators may include a beveled surface.

In some embodiments, the filter may further include a cover having a bendable tuning stub formed therein, and the bendable tuning stub may be positioned so that when the bendable tuning stub is bent at an angle with respect to a plane defined by the cover that corresponds to an angle of the beveled surface of the first of the additional resonators with respect to a plane defined by the cover, the beveled surface and the bendable tuning stub form a parallel plate capacitor.

In some embodiments, a magnitude of a first coupling between a first resonant cavity that includes the first resonator and a third resonant cavity that includes the third resonator is not equal to a magnitude of a second coupling between the third resonant cavity and a fourth resonant cavity that includes the fourth resonator.

In some embodiments, the magnitude of the first coupling may exceed the magnitude of the second coupling.

Pursuant to additional embodiments of the present invention, filters are provided that include a housing having a floor, a metal wall that is integral with the floor extending upwardly from the floor, and first through fourth resonators mounted within the housing to extend upwardly from the floor of the housing, the first through fourth resonators surrounding the wall when viewed from above. In these filters, the first through fourth resonators are configured to generate a transmission zero, and the first resonator, the second resonator and the fourth resonator are configured to resonate within a passband of the filter, while the third resonator is configured to resonate outside the passband of the filter.

In some embodiments, the filter may further comprise a first transmission line section that connects the first resonator to the second resonator and the second resonator to the fourth resonator and a second transmission line section that connects the first resonator to the third resonator and the third resonator to the fourth resonator.

In some embodiments, the first and second transmission line sections may form a closed structure when viewed from above.

In some embodiments, the third resonator may be configured to resonate below the passband of the filter.

In some embodiments, the metal wall may be a metal post.

In some embodiments, the first through fourth resonators may be arranged in a box section configuration.

In some embodiments, there may be no negative cross couplings between any pair of the first through fourth resonators.

In some embodiments, the third resonator may extend further upwardly from the floor of the housing than do any of the first, second resonator or resonators.

In some embodiments, the filter may include a plurality of additional resonators that extend upwardly from a floor of the housing, and a top surface of a first of the additional resonators may include a beveled surface.

In some embodiments, the filter may further include a cover having a bendable tuning stub formed therein, and the bendable tuning stub may be positioned so that when the bendable tuning stub is bent at an angle with respect to a plane defined by the cover that corresponds to an angle of the beveled surface of the first of the additional resonators with respect to a plane defined by the cover, the beveled surface and the bendable tuning stub form a parallel plate capacitor.

In some embodiments, a magnitude of a first coupling between the first resonant cavity and the third resonant cavity is not equal to a magnitude of a second coupling between the third resonant cavity and the fourth resonant cavity. In some embodiments, the magnitude of the first coupling may exceed the magnitude of the second coupling. In some embodiments, the magnitude of the first coupling may be at least twice the magnitude of the second coupling.

Pursuant to still further embodiments of the present invention, filters are provided that include a housing having a floor and a plurality of sidewalls, a resonator extending upwardly from the floor, the resonator having a beveled top surface, and a cover that is mounted opposite the floor.

In some embodiments, the beveled top surface may be a completely beveled top surface.

In some embodiments, the beveled top surface may be a partially beveled top surface.

In some embodiments, the filter may further comprise a bendable tuning stub formed in the cover adjacent the resonator having the beveled top surface.

In some embodiments, the bendable tuning stub may be positioned so that when the bendable tuning stub is bent at an angle with respect to a plane defined by the cover that corresponds to an angle of the beveled top surface of the resonator with respect to a plane defined by the cover, the beveled top surface and the bendable tuning stub form a parallel plate capacitor.

In some embodiments, the bendable tuning stub may be a single-bend tuning stub.

In some embodiments, a first axis defined by a top of the beveled top surface may be substantially parallel to a second axis defined by a bend in the bendable tuning stub.

In some embodiments, the beveled top surface may include first and second beveled portions that are beveled at different angles. In some embodiments, the first and second beveled portions may be separated by a flat portion.

Figure 1:
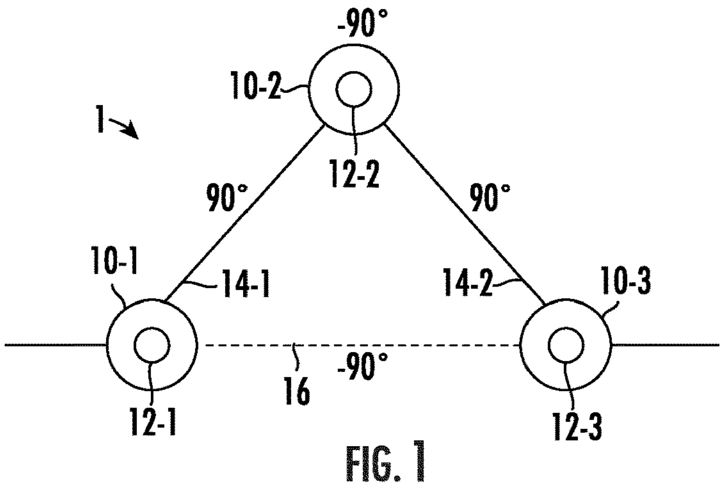
FIG. 1 is a schematic diagram illustrating a configuration of resonant cavities that may be used to generate a transmission zero below the passband of a filter.

Note that herein when multiple of the same elements or structures are provided, they may be referred to in some instances using two-part reference numerals, where the two parts are separated by a dash. Herein, such elements may be referred to individually by their full reference numeral and may be referred to collectively by the first part of the applicable reference numeral.

DETAILED DESCRIPTION

Pursuant to embodiments of the present invention, resonant cavity filters are provided that have detuned box section resonator configurations that generate a transmission zero below a passband of the filter. These filters may generate this transmission zero without the use of any negative couplings, which can simplify the mechanical design of the filter and also eliminate the potential problem of spurious resonances that may arise due to the metal parts that are conventionally used to generate negative cross couplings. The detuned box section resonator configurations that are included in the filters according to embodiments of the present invention may have at least four resonators that are arranged to define a box. The first resonator may serve as the input to the box section and the fourth resonator may serve as an output to the box section, and first and second transmission paths may be provided between the input and the output to the box section. The second and third resonators are interposed along the respective first and second RF transmission paths. The first, second and fourth resonators are configured to resonate within the passband of the filter, while the third resonator is configured to resonate below the passband of the filter. This configuration results in a 180° difference in phase shift along the two RF transmission paths, which results in the cancellation used to form the transmission zero below the passband of the filter.

Since the third resonator is configured to resonate below the passband, it may generate an undesired transmission peak in a stopband of the filter. According to the filter design techniques disclosed herein, a coupling ratio along the hops on one of the RF transmission paths may be adjusted to lower the amplitude of the transmission peak in the stopband as well as the frequency where this transmission peak occurs, to ensure that the filter exhibits acceptable stopband performance.

In some specific embodiments, filters are provided that include a housing and at least first through fourth resonators are mounted within the housing. The first resonator is configured to couple with the second resonator and the third resonator but not the fourth resonator. The second resonator is configured to couple with the first resonator and the fourth resonator but not the third resonator. The third resonator is configured to couple with the first resonator and the fourth resonator but not the second resonator. The fourth resonator is configured to couple with the second resonator and the third resonator but not the first resonator. The first, second and fourth resonators are configured to resonate within a passband of the filter, while the third resonator is configured to resonate outside the passband of the filter.

In other specific embodiments, filters are provided that include a housing and first through fourth resonators that are mounted to extend upwardly from a floor of the housing. A first transmission line branch is provided that connects the first resonator to the second resonator and the second resonator to the fourth resonator, and a second transmission line branch is provided that connects the first resonator to the third resonator and the third resonator to the fourth resonator. The first and second transmission line branches form a closed structure when viewed from above. The first, second and fourth resonators are configured to resonate within a passband of the filter, while the third resonator is configured to resonate outside the passband of the filter.

In still other specific embodiments, filters are provided that include a housing having a floor and a metal wall that extends upwardly from the floor. First through fourth resonators are mounted within the housing to extend upwardly from the floor, the first through fourth resonators surrounding the metal wall when viewed from above. The first through fourth resonators are configured to generate a transmission zero, and the first, second and fourth resonators are configured to resonate within a passband of the filter, while the third resonator is configured to resonate outside the passband of the filter.

Pursuant to further embodiments of the present invention, RF filters are provided that include a housing having a floor and a plurality of sidewalls, as well as a resonator that extends upwardly from the floor. The resonator has a partially or completely beveled top surface. These filters may also include a cover that is mounted opposite the floor. A tuning stub is formed in the cover. The tuning stub may be a bendable tuning stub that is formed as a cantilevered finger. The bendable tuning stub may be positioned so that when it is bent at an angle with respect to a plane defined by the cover that corresponds to an angle of the beveled top surface of the resonator with respect to a plane defined by the cover, the beveled surface and the bendable tuning stub form a parallel plate capacitor.

In some embodiments, the beveled top surface of the resonator may include first and second beveled portions. In some such embodiments, the top surface of the resonator may also include a flat portion which may, for example, be positioned between the first and second beveled portions. In some embodiments, the cover may include a pair of bendable tuning stubs that are associated with the resonator, where one of the tuning stubs is configured so that it can bend to form a plate capacitor with the first beveled surface, and the other of the tuning stubs is configured so that it can bend to form a plate capacitor with the second beveled surface.

Embodiments of the present invention will now be discussed in greater detail with reference to FIGS. 3-10D.

Figure 3:
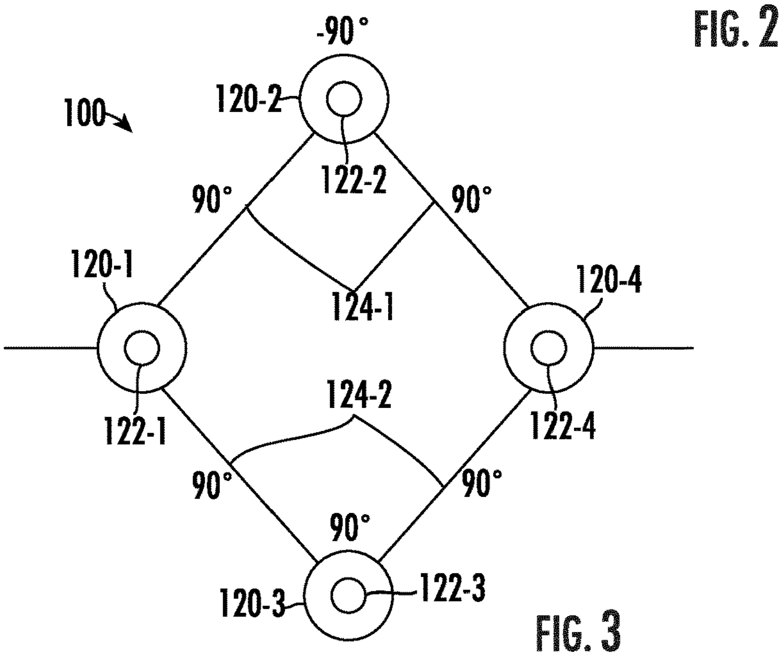
FIG. 3 is a schematic diagram of a filter according to embodiments of the present invention that includes a detuned box section resonator configuration that may be used to generate a transmission zero below the passband without any negative cross couplings.

FIG. 3 is a schematic diagram of a bandpass filter 100 according to embodiments of the present invention that includes a box section resonator configuration that may be used to generate a transmission zero below the passband of filter 100 without requiring any negative cross couplings. As shown in FIG. 3, the bandpass filter 100 includes at least four resonant cavities 120-1 through 120-4 that are configured to generate a transmission zero below a passband of filter 100. Filter 100 can, and typically will, include additional resonant cavities 120 that are not shown in FIG. 3. Each resonant cavity 120 may include a respective resonator 122-1 through 122-4 mounted therein.

Each resonator 122 may be tuned to resonate at a preselected frequency. For example, the height of each resonator 122 may be set so that the resonator 122 will resonate at a desired frequency. Resonators 122-1, 122-2 and 122-4 are configured or "tuned" to have resonant frequencies that are within the passband of filter 100, while resonator 122-3 is deliberately tuned to have a resonant frequency f3 that is well below the passband of filter 100. With this arrangement, for frequencies between f3 and the lower end of the passband of filter 100, resonator 122-3 will contribute a +90° phase shift, while resonator 122-2 will contribute a −90° phase shift, as is shown in FIG. 3. Thus, RF signals in the frequency range where the transmission zero is to be generated (i.e., RF signals that are just below the passband) that pass from resonant cavity 120-1 to resonant cavity 120-4 along a first transmission path 124-1 that extends through resonant cavity 120-2 will experience a phase shift of 90°+(−90°)+90°=90°. Similarly, RF signals in the frequency range where the transmission zero is to be generated that pass from resonant cavity 120-1 to resonant cavity 120-4 along a second transmission path 124-2 that extends through resonant cavity 120-3 will experience a phase shift of 90°+90°+90°=270°. Cancellation will thus occur with respect to RF signals propagating from resonant cavity 120-1 to resonant cavity 120-4 in light of the 180° phase offset (270°−90°) induced in the sub-components of the RF signal traversing the first and second transmission paths 124-1, 124-2 therebetween. By configuring filter 100 so that the magnitudes of the two sub-components will be approximately equal, a transmission zero may be created below the passband.

Figure 4:
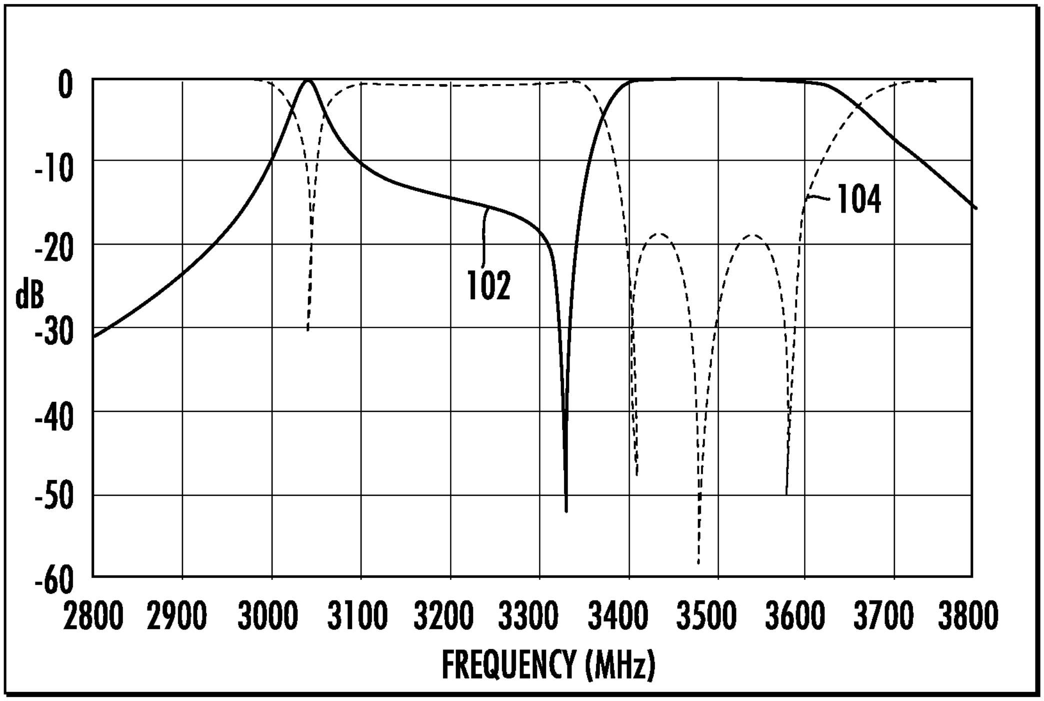
FIG. 4 is a graph illustrating the frequency response and return loss characteristics of a resonant cavity filter that include the detuned box section resonator configuration of FIG. 3.

FIG. 4 is a graph illustrating the frequency response (curve 102) and return loss (curve 104) characteristics of a resonant cavity filter that include the box section resonant cavity configuration of FIG. 3. As shown in FIG. 4, the passband for filter extends from 3400 MHz to 3600 MHz. The filter exhibits a return loss of at least −18 dB throughout the passband. The frequency response includes a transmission zero at 3331 MHz, which provides a sharp cutoff between the lower end of the passband and the associated stopband. Resonator 122-3 is configured to resonate at 3111 MHz (i.e., below the passband) and the coupling between resonant cavities 120-1 and 120-3 was set to be equal in magnitude to the coupling between resonant cavities 120-3 and 120-4.

As shown in FIG. 4, while the filter exhibits good passband performance and has the desired sharp cutoff at the lower end of the passband, the stopband attenuation is limited by the presence of an undesired transmission peak at about 3040 MHz. By changing a ratio k that represents the strength of the coupling between resonant cavities 120-1 and 120-3 as compared to the strength of the coupling between resonant cavities 120-3 and 120-4, the undesired transmission peak shown in the stopband response in FIG. 4 can be lowered in both amplitude and frequency, thus improving the stopband performances of the filter.

Figure 2:
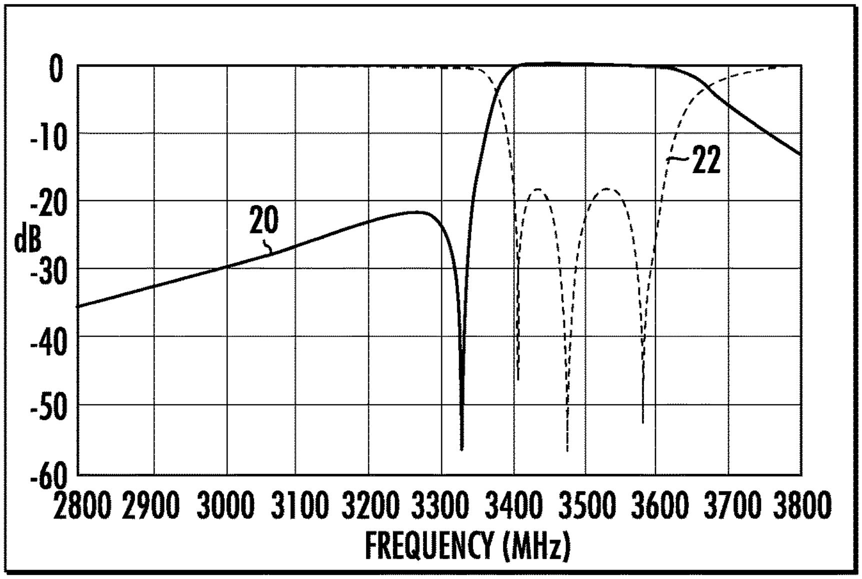
FIG. 2 is a graph illustrating the frequency response and return loss characteristics of a resonant cavity filter that include the resonant cavity configuration of FIG. 1.
Figure 5:
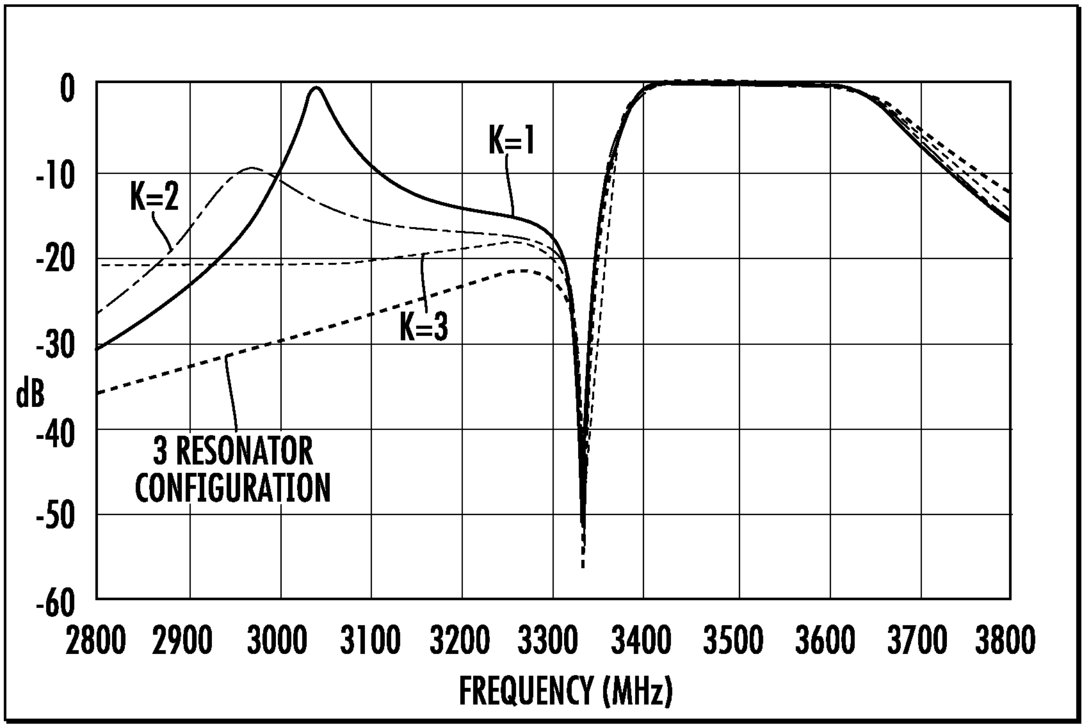
FIG. 5 is a graph that illustrates the frequency response of three different versions of the filter of FIG. 3 that include different coupling ratios k.

FIG. 5 is a graph that illustrates the frequency response of three different versions of filter 100 that include coupling ratios k having values of 1, 2 and 3. The frequency response of filter 1 of FIG. 1 (which is shown in FIG. 2) is also included in FIG. 5 as a point of reference. As can be seen in FIG. 5, by setting k equal to 3, the transmission peak in the stopband can effectively be eliminated so that RF signal transmission in the stopband is maintained at very low levels.

Thus, in some embodiments, a magnitude of a first coupling between a first resonant cavity 120-1 of a box section resonator configuration and the third resonant cavity 120-3 of the box section resonator configuration is not equal to a magnitude of a second coupling between the third resonant cavity 120-3 and a fourth resonant cavity 120-4 of the box section resonator configuration. For example, the magnitude of the first coupling may exceed the magnitude of the second coupling. In some embodiments, the magnitude of the first coupling may be at least 1.5 times, at least twice, at least 2.5 times or at least three time the magnitude of the second coupling.

Figure 6A:
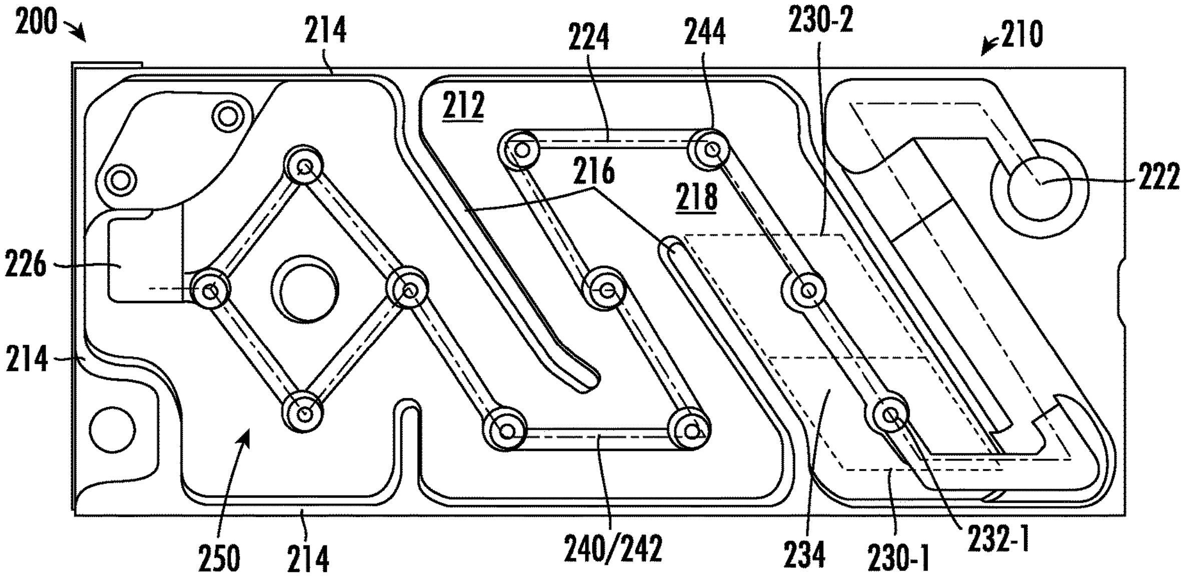
FIG. 6A is a top view of a filter according to embodiments of the present invention with the cover removed.

FIG. 6A is a top view of a bandpass filter 200 according to embodiments of the present invention with a metal cover thereof removed. As shown in FIG. 6A, the bandpass filter 200 includes a housing 210. The housing 210 may comprise, for example, a die cast or machined metal housing that includes a floor 212 and a plurality of external sidewalls 214 that extend upwardly from the floor 212. The housing 210 further includes a plurality of inner walls 216 which similarly extend upwardly from the floor 212. A metal cover (not shown) is provided that may be attached (e.g., by screws or soldering) to the housing 210. Typically, the cover is mounted on top surfaces of the external sidewalls 214 and the internal sidewalls 216 (or on ledges formed in the external sidewalls 214). The interior of the housing 210 (i.e., the region between the floor 212, exterior sidewalls 214 and cover) is mostly open to define a cavity 218.

Filter 200 further include an input port 222 and an output port 226 that are used to couple RF signals into and out of the housing 210. The input port 222 and the output port 226 may, for example, each be formed as a coaxial connector that has an outer conductor contact that is physically and electrically connected to the housing 210 and a center conductor contact that extends through an opening in the housing 210 and into the interior thereof. While not shown in FIG. 6A, the input port 222 and the output port 226 may each connect to external RF transmission line structures such as, for example, coaxial cables. RF signals may be input to filter 200 through input port 222 and may pass along an RF transmission path 224 through filter 200 to the output port 226.

The filter 200 includes a plurality of resonant cavities 230. Each resonant cavity 230 may include a resonator 232 mounted therein. The resonant cavities 230 are defined by the floor 212, sidewalls 214 and/or internal walls 216, and cover of filter 200. Adjacent resonant cavities 230 along RF transmission path 224 are connected by windows 234 which allow RF energy to couple between adjacent resonant cavities 230. The windows 234 in the depicted embodiment are large windows that are open from the floor 212 to the metal cover of filter 200. Resonant cavities 230-1 and 230-2 are shown in FIG. 6A using dashed lines. Resonant cavities 230-3 through 230-11 are not similarly outlined in FIG. 6A to simplify the figure, but their locations are apparent based on the locations of their associated resonators 232.

Figure 6B:
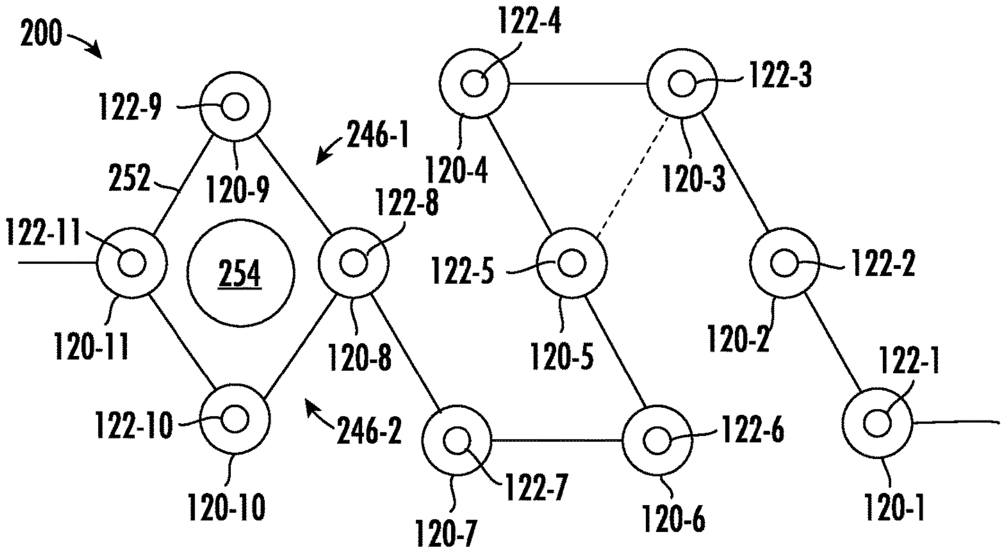
FIG. 6B is a schematic diagram of the filter of FIG. 6A.

FIG. 6B is a schematic illustration of the resonant cavities and couplings included in the filter 200 of FIG. 6A. As is shown in FIGS. 6A-6B, a total of eleven resonators 232-1 through 232-11 are mounted within housing 210. Each resonator 232 may be mounted to extend upwardly from the floor 212 of housing 210. The resonators 232 may be implemented, for example, as metal TEM resonators. The dimensions (e.g., the height) of each resonator 232 may be selected so that the resonators 232 will resonate at desired frequencies. The resonators 232 are arranged between the internal walls 216 of housing 210 in a fashion so that, for the most part, each resonator 232 will only couple with adjacent resonators 232 along the transmission path 224. For example, resonator 232-2 is positioned so that it will only couple with resonators 232-1 and 232-3. It will also be appreciated that some or all of the resonators 232 can alternatively be arranged to extend downwardly from the metal cover of filter 200.

It will be appreciated that filter 200 could alternatively be designed so that resonators 232-1 through 232-7 simply extended in a long line between a pair of walls of housing 210. In the embodiment of FIGS. 6A-6B, the sidewalls 214 and internal walls 216 are configured so that the resonators 232 may extend in a "folded line" which increases the width of filter 200, but reduces the length thereof. This is a good tradeoff as four of the resonators 232 are arranged in detuned box section resonator configuration, as will be explained below, and this configuration may result in an increase in the width of filter 200, so that using the folded line approach may act to decrease the size of filter 100.

The resonant cavities 230 and resonators 232 may be configured to pass RF signals having frequencies within the passband of filter 200 from the input port 222 to the output port 226, while substantially blocking RF signals that have frequencies within a stopband frequency range of the filter 200 from passing from the input port 222 to the output port 226. The stopband may be all frequencies outside the passband, but may alternatively only encompass some frequencies on either side of the passband.

An RF transmission line 240 is mounted within the housing 210. The RF transmission line 240 may extend from the input port 222 to the output port 226, and may be configured to couple with each of the resonators 232. In the depicted embodiment, RF transmission line 240 is implemented as a metal strip 242 (which may or may not be a planar metal strip) that includes openings 244 that allow the metal strip 242 to be mounted on the resonators 232. The metal strip 242, in conjunction with the housing 210 (which is coupled to the ground conductors of the RF transmission lines that are connected to the input and output ports 222, 226), forms a stripline RF transmission line 240. The stripline transmission line 240 may have the design disclosed in U.S. Pat. No. 11,158,918 (see, e.g., FIG. 6), the entire content of which is incorporated herein by reference as if set forth in its entirety. Dielectric standoffs (not shown) may be used to space the stripline RF transmission line 240 apart from at least some of the resonators 232 so that the stripline RF transmission line 240 capacitively couples with such resonators 232.

As shown by the dashed line in FIG. 6B, a positive cross-coupling is provided between resonator 232-3 and resonator 232-5. This positive cross-coupling is used to generate a first transmission zero in the frequency response for filter 200 that is above the upper end of the passband of filter 200. Filter 200 is designed to have a passband of 3400-3800 MHz, so the first transmission zero may be above 3800 MHz (e.g., about 3850-3875 MHz in example embodiments). Each resonator 232-1 through 232-7 may be configured to have a resonant frequency within the passband of filter 200.

Resonators 232-8 through 232-11 are arranged in a box section configuration 250. As shown, stripline RF transmission line 240 splits at resonator 232-8 into a first branch 246-1 and a second branch 246-1. The first branch 246-1 connects resonator 232-8 to resonator 232-11 through resonator 232-9, and the second branch 246-2 connects resonator 232-8 to resonator 232-11 through resonator 232-10. The first and second branches 246-1, 246-2 form a closed structure (here a square-shaped structure) when viewed from above. An internal wall 254 extends upwardly from the floor 212 of housing 210 in the interior of the box 252 defined by box section configuration 250.

As shown, the internal wall 254 may comprise a post-shaped wall 254 (also referred to herein as a "post" 254). The post 254 may be interposed along a first axis that extends through resonator 232-8 and 232-11. The post 254 may also be interposed along a second axis that extends through resonator 232-9 and 232-10. Accordingly, the post 254 may prevent cross-coupling between resonators 232-8 and 232-11 and between resonators 232-9 and 232-10. Thus, the box section configuration 250 includes first through fourth resonators, where the first resonator 232-8 is configured to couple with the second resonator 232-9 and the third resonator 232-10 but not the fourth resonator 232-11, the second resonator 232-9 is configured to couple with the first resonator 232-8 and the fourth resonator 232-11 but not the third resonator 232-10, the third resonator 232-10 is configured to couple with the first resonator 232-8 and the fourth resonator 232-11 but not the second resonator 232-9, and the fourth resonator 232-11 is configured to couple with the second resonator 232-9 and the third resonator 232-10 but not the first resonator 232-8. The post 254 may, for example, be soldered to the cover of filter 200. The post 254 may be die cast as part of the housing 210 so that it is integral (monolithic) with the housing 210. It will also be appreciated that the post 254 may comprise multiple walls/posts.

Resonators 232-8, 232-9 and 232-11 may each be configured to have a resonant frequency that is within the passband of filter 200. Resonators 232-8, 232-9 and 232-11 may each be configured to resonate at a different frequency within the passband of filter 200 in some embodiments. In contrast, resonator 232-10 is configured to have a resonant frequency that is outside the passband of filter 200. In particular, resonator 232-10 is configured to have a resonant frequency that is well below the passband of filter 200. In example embodiments, resonator 232-10 may be configured to resonate at a frequency between 2900-3300 MHz. Resonator 232-10 may be taller than each of resonators 232-8, 232-9 and 232-11 so that it will resonate at a lower frequency than resonators 232-8, 232-9 and 232-11. Resonators 232-8, 232-9 and 232-11 may each have different heights, where the height of a resonator 232 refers to the distance that the resonator extends above a plane defined by the floor 212 of housing 210.

By "detuning" resonator 232-10 (i.e., by configuring resonator 232-10 to resonate below the passband), a negative phase shift is generated between resonators 232-8 and 232-11 along the second branch 246-2 of RF transmission line 240 that connects resonator 232-8 to resonator 232-11. A positive phase shift is generated between resonators 232-8 and 232-11 along the first branch 246-1 of RF transmission line 240 that connects resonator 232-8 to resonator 232-11. The positive and negative phase shifts may be configured to generate a transmission zero in the frequency response for filter 200 that is below the passband for filter 200. Since one of the resonators 232 included in the box section resonator configurations 250 according to embodiments of the present invention is detuned, the box section resonator configurations 250 according to embodiments of the present invention are referred to herein as "detuned box section resonator configurations."

As discussed above, the conventional technique for generating a transmission zero below the passband of a bandpass filter is to use one or more electrically floating metal parts to generate a negative cross coupling. These metal parts typically have tight tolerances, and hence may be more difficult to implement in filters operating at higher operating frequencies, since the size of the elements of the filter are inversely proportional to frequency. Mounting structures must also be provided to hold the floating metal parts in place, which tends to increase both the size and mechanical complexity of the filter. Moreover, the floating metal parts will have their own "spurious" resonant frequencies. Thus, the size of the metal parts must be carefully designed to ensure that the spurious resonant frequencies of the metal parts are not close to passband of the filter. Thus, the conventional techniques for generating negative cross-couplings in a passband filter have various shortcomings which can increase the cost and/or reduce the performance of a bandpass filter.

Bandpass filters having detuned box section resonator configurations do not include any negative cross couplings.

Accordingly, the filters according to embodiments of the present invention avoid the above challenges with the conventional techniques for generating negative cross-couplings. Moreover, the detuned box section resonator configurations disclosed herein can be implemented, in example embodiments, by simply adding one additional resonator and an additional transmission line section to the filter. In many cases, the resonators 232 may by die cast as part of the housing 210, and hence the only expense associated with adding an additional resonator is, potentially, a very small increase in the size of the filter 200. The stripline RF transmission line 240 may, for example, be implemented as a stamped metal strip 242, and hence adding the additional transmission line branch 246-2 may also involve minimal increases in cost and/or complexity.

It should be noted that a box section resonator configuration is known in the art, as discussed in R. J. Cameron, A. R. Harish and C. J. Radcliffe, "Synthesis of advanced microwave filters without diagonal cross-couplings," *IEEE Transactions on Microwave Theory and Techniques*, vol. 50, no. 12, pp. 2862-2872, December 2002, doi: 10.1109/TMTT.2002.805141 (herein "Cameron"). The box section resonator configuration disclosed in Cameron uses four resonators that are disposed in a box configuration, but all of the resonators are configured to have resonant frequencies within the passband of the filter. The box section resonator configuration of Cameron thus has four in-band transmission peaks and may generate two transmission zeros, with at least one transmission zero being below the passband of the filter. In contrast, the detuned box section resonator configurations according to embodiments of the present invention only have three in-band transmission peaks and generate a single transmission zero that is below the passband of the filter. Moreover, one of the couplings of the box section resonator configuration disclosed in Cameron is a negative coupling, whereas the detuned box section resonator configurations according to embodiments of the present invention do not have any negative couplings, and hence avoid the above discussed disadvantages of such negative couplings. Moreover, while the detuned box section resonator configurations according to embodiments of the present invention generate an undesired transmission peak below the passband, this transmission peak may be dampened using, for example, the techniques discussed above with reference to FIG. 5.

Figure 7A:
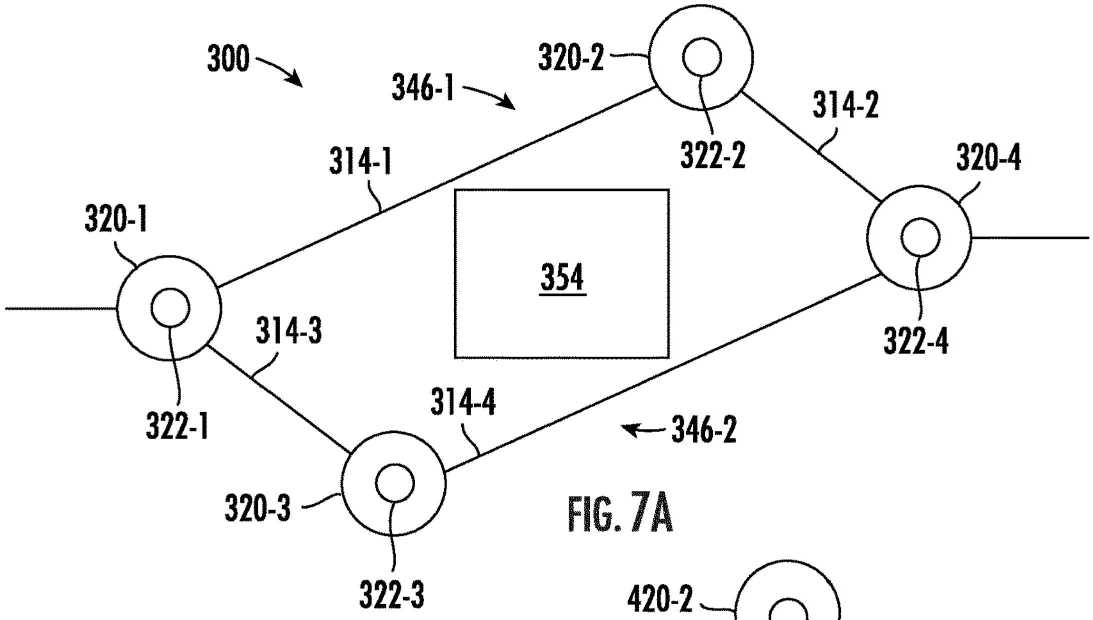
FIG. 7A is a schematic diagram of a filter that includes a detuned box section resonator configuration that has a non-square parallelogram shape.

It will be appreciated that FIGS. 6A-6B illustrate one example implementation of a detuned box section resonator configuration in which the box 252 has a square shape. In other embodiments, the box 252 defined by the detuned box section resonator configuration may have different shapes. For example, FIG. 7A schematically illustrates a filter 300 that includes a detuned box section resonator configuration according to further embodiments of the present invention that has a non-square parallelogram shape. As can be seen, the detuned box section resonator configuration of filter 300 includes first through fourth resonant cavities 320-1 through 320-4 that include associated first through fourth resonators 322-1 through 322-4. The resonant cavities 320 are arranged to define a non-square parallelogram shaped box when viewed from above. Resonant cavity 320-1 couples with resonant cavity 320-2 via a first coupling 314-1 and resonant cavity 320-2 couples with resonant cavity 320-4 via a second coupling 314-2. The first and second couplings 314-1, 314-2 form a first RF transmission path 346-1 between resonant cavity 320-1 and resonant cavity 320-4. Notably, first coupling 314-1 is longer than second coupling 314-2. Similarly, resonant cavity 320-1 couples with resonant cavity 320-3 via a third coupling 314-3 and resonant cavity 320-3 couples with resonant cavity 320-4 via a fourth coupling 314-4. The third and fourth couplings 314-3, 314-4 form a second RF transmission path 346-1 between resonant cavity 320-1 and resonant cavity 320-4. Notably, fourth coupling 314-4 is longer than third coupling 314-3. A metal wall 354 is provided within the box defined by resonant cavities 320-1 through 320-4 that prevents cross coupling between resonant cavities 320-1 and 320-4 and between resonant cavities 320-2 and 320-3.

Figure 7B:
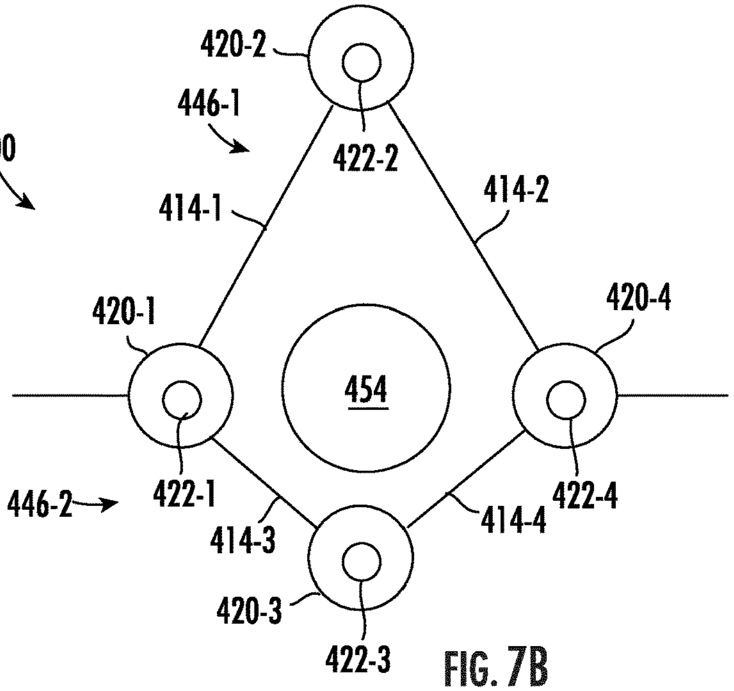
FIG. 7B is a schematic diagram of a filter that includes a detuned box section resonator configuration that has RF transmission line sections having different path lengths.

FIG. 7B schematically illustrates a filter 400 that includes a detuned box section resonator configuration according to still further embodiments of the present invention. The detuned box section resonator configuration of filter 400 has RF transmission line sections having different path lengths. As can be seen, the detuned box section resonator configuration of filter 400 includes first through fourth resonant cavities 420-1 through 420-4 that include associated first through fourth resonators 422-1 through 422-4. The resonant cavities 420 are arranged to define a trapezoid shape when viewed from above. Resonant cavity 420-1 couples with resonant cavity 420-2 via a first coupling 414-1 and resonant cavity 420-2 couples with resonant cavity 420-4 via a second coupling 414-2. The first and second couplings 414-1, 414-2 form a first RF transmission path 446-1 between resonant cavity 420-1 and resonant cavity 420-4. Similarly, resonant cavity 420-1 couples with resonant cavity 420-3 via a third coupling 414-3 and resonant cavity 420-3 couples with resonant cavity 420-4 via a fourth coupling 414-4. The third and fourth couplings 414-3, 414-4 form a second RF transmission path 446-1 between resonant cavity 420-1 and resonant cavity 420-4. Notably, the first RF transmission path 446-1 is longer than the second RF transmission path 446-2. A metal wall 454 is provided within the trapezoid defined by resonant cavities 420-1 through 420-4 that prevents cross coupling between resonant cavities 420-1 and 420-4 and between resonant cavities 420-2 and 420-3. Different dielectric materials may surround the stripline RF transmission line sections that form the first RF transmission path 446-1 and the second RF transmission path 446-2 in order to obtain the desired phasing along each RF transmission line section.

Figure 7C:
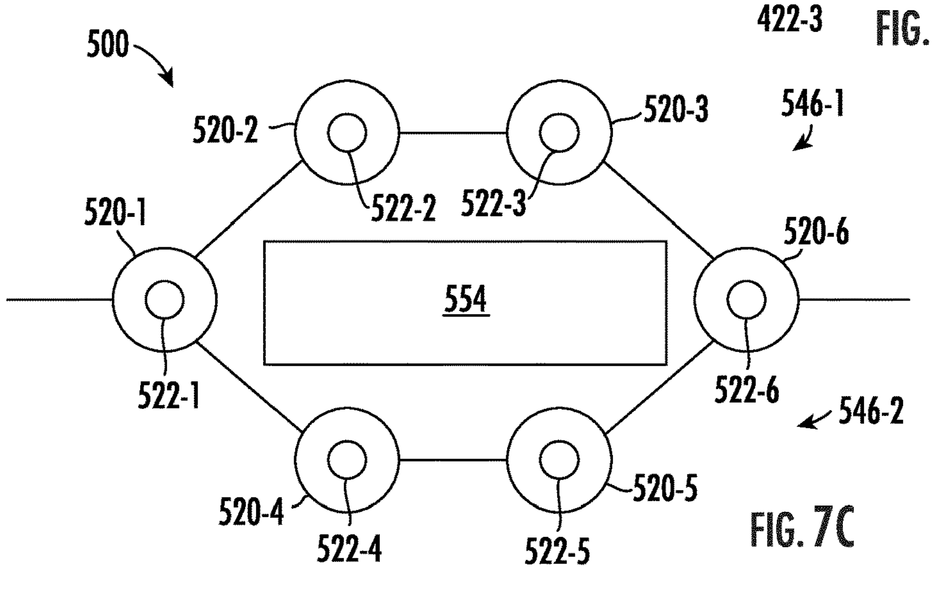
FIG. 7C is a schematic diagram of a filter that includes a detuned box section resonator configuration that includes six resonant cavities.

Pursuant to further embodiments of the present invention, filters are provided that have detuned box section resonator configurations that are formed using more than four resonators. For example, FIG. 7C illustrates a portion of a filter 500 that includes a detuned box section resonator configurations that includes six resonant cavities 520-1 through 520-6 that have associated resonators 522-1 through 522-6. Two RF transmission paths 546-1, 546-2 are provided that connect resonant cavity 520-1 to resonant cavity 520-6, with two intermediate resonant cavities along each path 546. One of the four resonant cavities 520-2 through 520-5 may be detuned to have a resonant frequency below the passband of filter 500, while the remaining resonant cavities all have resonant frequencies within the passband of filter 500. A metal wall 554 is provided within the area defined inside resonant cavities 520-1 through 520-6 (when viewed from above) that prevents cross coupling between non-adjacent ones of resonant cavities 520-1 through 520-6.

Pursuant to further embodiments of the present invention, RF filters are provided that include resonators having partially or completely beveled top surfaces. Conventionally, resonators have flat top surfaces that capacitively couple with, for example a cover of the filter and/or a tuning element such as a tuning screw or a bendable tuning stub. The position of the tuning element with respect to the resonator may be varied by moving the tuning element in order to adjust the center frequencies of the passband and/or the stopband of the filter.

Figure 8:
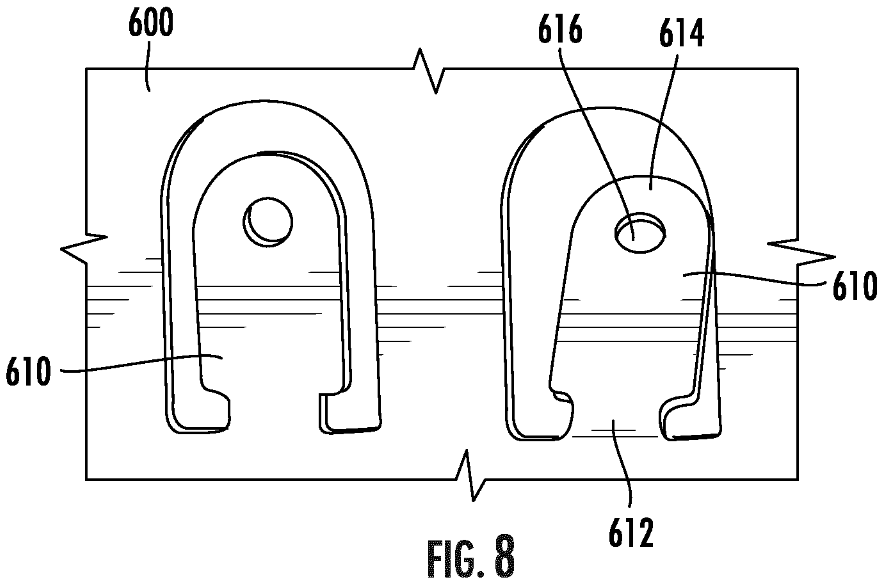
FIG. 8 is a schematic perspective view of a cover of a conventional filter.

Referring to FIG. 8, a cover 600 of a conventional filter is depicted that includes a bendable tuning stub 610. As shown in FIG. 8, bendable tuning stub 610 comprises a cantilevered finger having a base 612 that attaches to the top cover 600 and a distal end 614 that is opposite the base 612. A hole 616 may be formed in the distal end 614 of the tuning stub 610. Tuning stub 610 may be formed simply by cutting a U-shaped area out of the top cover 600. The base 612 of tuning stub 610 may be narrower than the remainder of the tuning stub 610 to make it easier to bend the tuning stub 610. Tuning stub 610 may be very robust mechanically and may be very simple and inexpensive to form.

In order to tune a filter that include tuning stub 610, tuning stub 610 is bent downwardly so that the distal end 614 thereof is received into the cavity of the filter. Tuning stub 610 acts to tune the filter by changing the amount of coupling between the cover 600 and a resonator (not shown) that is disposed beneath tuning stub 610. Since only the distal end 614 of tuning stub 610 moves significantly closer to the resonator, the tuning effect of the tuning stub 610 may be low as tuning stub 610 primarily edge couples with the resonator. As a result, a larger number of tuning stubs 610 may be required, which increases manufacturing costs, and a desired tuning range for the filter may not be achievable. Thus, while tuning stub 610 has the advantage of simplicity, it also has performance limitations.

Pursuant to further embodiments of the present invention, resonators for RF filters are provided that may exhibit improved performance when used with bendable tuning stubs. The resonators according to embodiments of the present invention have partially or completely beveled top surfaces, where the beveled top surface is positioned so that when a bendable tuning stub is bent downwardly, the tuning stub forms a plate capacitor with at least a portion of the top surface of the resonator, which can result in significantly increased coupling between the resonator and the tuning stub.

Figure 9A:
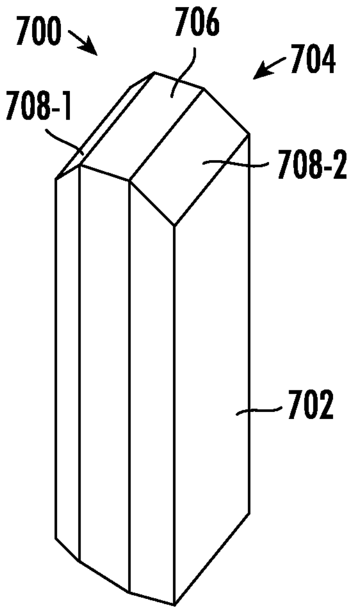
FIG. 9A is a perspective view of a resonator according to embodiments of the present invention that have partially beveled top surfaces.

FIG. 9A is a perspective view of a resonator 700 according to embodiments of the present invention that has partially beveled top surfaces. As shown, resonator 700 includes a stalk 702 that has a top surface 704 that includes a flat upper portion 706 and first and second beveled portions 708-1, 708-2, where each beveled portion 708 extends at an angle of about 40° with respect to the flat upper portion 706.

Figure 9B:
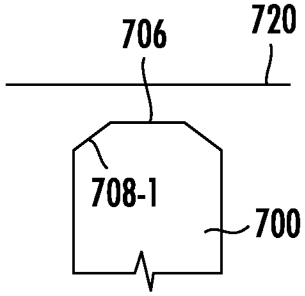
FIG. 9B is a side view of the resonator of FIG. 9A.
Figure 9C:
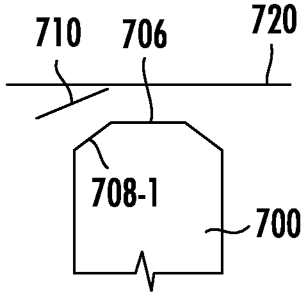
FIGS. 9C-9E are schematic side views that illustrate how the resonator of FIGS. 9A-9B interacts with a bendable tuning stub that is mounted in a cover of a filter.
Figure 9D:
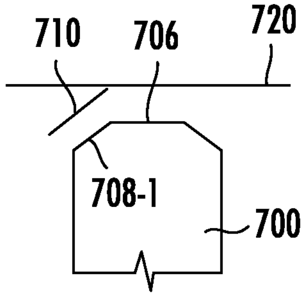

FIGS. 9B-9D are schematic side views that illustrate how resonator 700 of FIG. 9A interacts with a respective bendable tuning stub 710 that may be mounted in a cover 720 of a filter above the resonator 700. In particular, FIG. 9B illustrates the relative positions of the top surface 704 of resonator 700 and the tuning stub 710 before the tuning stub 710 has been bent. As can be seen, tuning stub 710 (or a portion of the cover) and the flat upper portion 706 of the top surface 704 of resonator 700 form a parallel plate capacitor. FIGS. 9C and 9D illustrate the relative positions of the top portion of the resonator 700 and the tuning stub 710 after the tuning stub 710 has been bent to an angle of about 20° (FIG. 9C) and to an angle of about 40° (FIG. 9D). As shown in FIG. 9D, when the tuning stub is bent by about 20°, the coupling between the resonator 700 and the cover 720 increases as the tuning stub 710 moves closer to the first beveled portion 708-1 of the top surface 704 of resonator 700. Moreover, while the two coupling surfaces are not parallel to each other, they do form opposed plate-like surfaces that will exhibit increased coupling as compared to the edge coupling that occurs with the conventional tuning stub (see FIG. 8). As shown in FIG. 9D, when the tuning stub 710 is bent by about 40°, the tuning stub 710 and the first beveled portion 708-2 of the top surface 704 of resonator 700 are even closer to each other, and the two coupling surfaces may now be nearly parallel to each other, further increasing the coupling. As FIGS. 9A-9D make clear, the used of resonators having beveled top surfaces may allow for increased coupling between the cover and the resonator, which may allow for a greater tuning range.

Figure 9E:
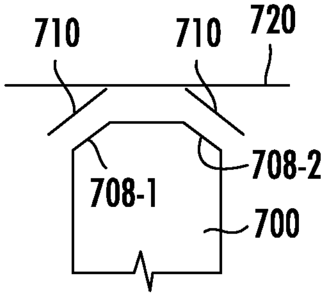

As shown in FIGS. 9A-9D, the top surface of resonator 700 includes first and second beveled surfaces 708-1, 708-2 on either side of the flat portion 706. As shown in FIG. 9E, this design may allow two tuning stubs 710 to be associated with resonator 700, which may further extend the tuning range for the filter.

Figure 10A:
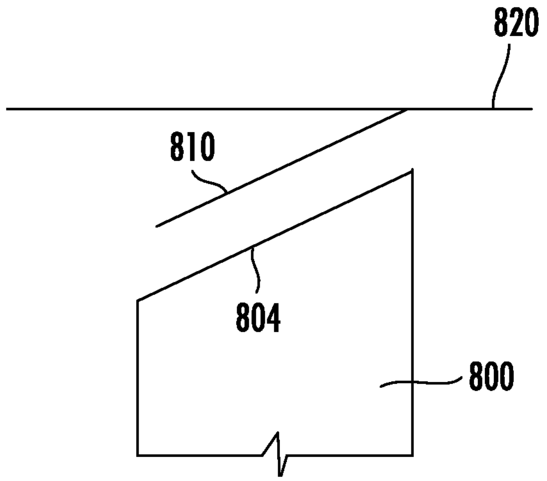
FIGS. 10A-10D are schematic side views that illustrates additional resonators according to embodiments of the present invention that have beveled top surfaces and how these resonator may couple with bendable tuning stubs in the cover of a filter.
Figure 10B:
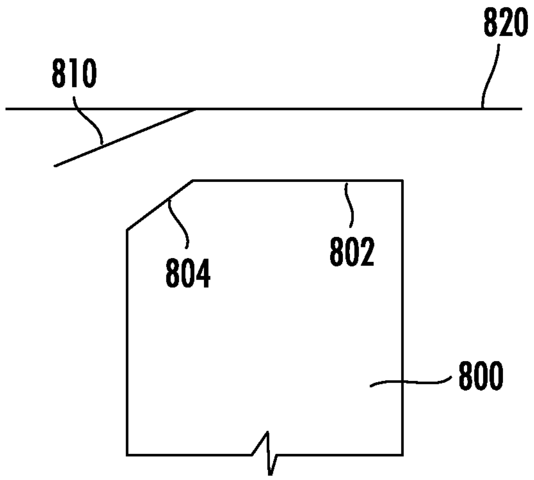
Figure 10C:
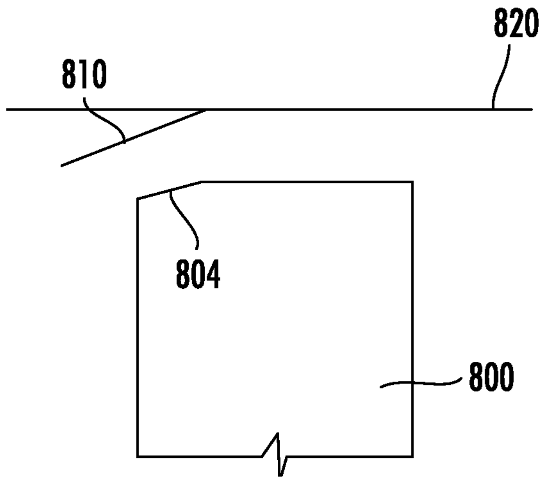
Figure 10D:
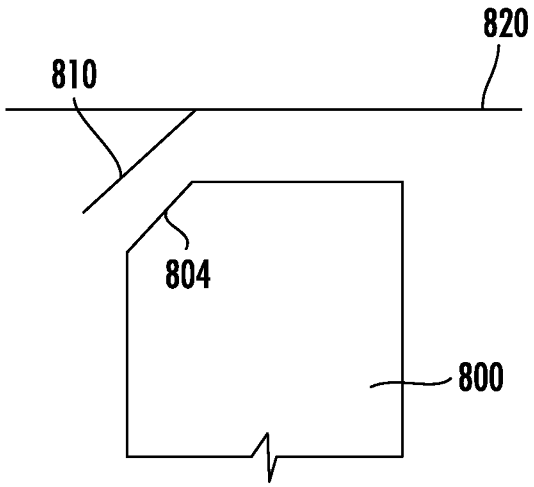

It will be appreciated that resonators may be provided that have a wide variety of beveled top surfaces. For example, FIG. 10A is a schematic side view that illustrates a resonator 800 having a fully beveled top surface 804 and how the resonator 800 may couple with a tuning stub 810 that is formed in a cover 820 of a filter. FIG. 10B illustrates a resonator 830 that has a top surface having a flat portion 802 and a single beveled portion 804. FIGS. 10C and 10D illustrate how the angle of the bevel 804 of resonator 800 may be varied in still other embodiments. The angle of the bevel may similarly be changed in any of the other resonators according to embodiments of the present invention.

Any of the resonators that include beveled top surfaces may be used to implement some or all of the resonators included on the filters according to embodiments of the present invention. Thus, pursuant to embodiments of the present invention, filters are provided that have a housing having a floor and a plurality of sidewalls, a resonator extending upwardly from the floor, the resonator having a beveled top surface, and a cover that is mounted opposite the floor. The beveled top surface may be a partially beveled top surface or a completely beveled top surface. These filters may further comprise a bendable tuning stub formed in the cover adjacent the resonator having the beveled top surface. The bendable tuning stub may be positioned so that when it is bent at an angle with respect to a plane defined by the cover that corresponds to an angle of the beveled top surface of the resonator with respect to a plane defined by the cover, the beveled top surface and the bendable tuning stub form a parallel plate capacitor.

The filters according to embodiments of the present invention may be less complex and less expensive to manufacture than conventional bandpass filters, and may provide comparable performance. The filters may also exhibit greater tuning ranges due to the beveled top surfaces of the resonators.

It will be appreciated that many modifications may be made to the filters disclosed herein without departing from the scope of the present invention. For example, the number of resonant cavities and resonators may be varied based on a desired filter response. As another example, the locations of the resonant cavities may be changed. Different types of resonators may be used, and the input and output ports may have any conventional port design. The cover may be fixed in place using screws rather than by soldering, and any appropriate type of tuning elements may be used. The number and arrangement of the resonators may be selected based on a desired response for the filter.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A filter, comprising:

a housing having an input port and an output port; and first through fourth resonators mounted within the housing, wherein the first resonator is configured to couple with the second resonator and the third resonator but not the fourth resonator, wherein the second resonator is configured to couple with the first resonator and the fourth resonator but not the third resonator, wherein the third resonator is configured to couple with the first resonator and the fourth resonator but not the second resonator, wherein the fourth resonator is configured to couple with the second resonator and the third resonator but not the first resonator, and wherein the first resonator, the second resonator and the fourth resonator are configured to resonate within a passband of the filter, while the third resonator is configured to resonate outside the passband of the filter.

2. The filter of claim 1, further comprising at least one wall that extends from a floor of the housing that is interposed along a first axis that extends through the first resonator and the fourth resonator.

3. The filter of claim 2, wherein the at least one wall comprises a single post-shaped wall.

4. The filter of claim 3, wherein the post-shaped wall is also interposed along a second axis that extends through the second resonator and the third resonator.

5. The filter of claim 1, wherein the third resonator extends further upwardly from a floor of the housing than do any of the first resonator, the second resonator or the fourth resonator.

6. The filter of claim 1, further comprising a transmission line that extends from an input to the filter to an output of the filter, wherein the transmission line includes:

a first branch that connects the first resonator to the second resonator and the second resonator to the fourth resonator; and a second branch that connects the first resonator to the third resonator and the third resonator to the fourth resonator.

7. The filter of claim 1, wherein the filter includes a plurality of additional resonators that extend upwardly from a floor of the housing, and wherein a top surface of a first of the additional resonators includes a beveled surface.

8. The filter of claim 7, wherein the filter further includes a cover having a bendable tuning stub formed therein, and wherein the bendable tuning stub is positioned so that when the bendable tuning stub is bent at an angle with respect to a plane defined by the cover that corresponds to an angle of the beveled surface of the first of the additional resonators with respect to a plane defined by the cover, the beveled surface and the bendable tuning stub form a parallel plate capacitor.

9. A filter, comprising:

a housing having an input port and an output port; and first through fourth resonators mounted within the housing to extend upwardly from a floor of the housing, a first transmission line branch that connects the first resonator to the second resonator and the second resonator to the fourth resonator; and a second transmission line branch that connects the first resonator to the third resonator and the third resonator to the fourth resonator, wherein the first and second transmission line branches form a closed structure when viewed from above, and wherein the first resonator, the second resonator and the fourth resonator are configured to resonate within a passband of the filter, while the third resonator is configured to resonate outside the passband of the filter.

10. The filter of claim 9, wherein the third resonator is configured to resonate below the passband of the filter.

11. The filter of claim 10, wherein the first through fourth resonators define a box when viewed from above.

12. The filter of claim 9, wherein there are no negative cross couplings between any pair of the first through fourth resonators.

13. The filter of claim 12, wherein the third resonator extends further upwardly from the floor of the housing than do any of the first resonator, the second resonator or the fourth resonator.

14. The filter of claim 9, wherein a magnitude of a first coupling between a first resonant cavity that includes the first resonator and a third resonant cavity that includes the third resonator is not equal to a magnitude of a second coupling between the third resonant cavity and a fourth resonant cavity that includes the fourth resonator.

15. The filter of claim 14, wherein the magnitude of the first coupling exceeds the magnitude of the second coupling.

16. A filter, comprising:

a housing having a floor;

a metal wall that is integral with the floor extending upwardly from the floor;

first through fourth resonators mounted within the housing to extend upwardly from the floor of the housing, the first through fourth resonators surrounding the wall when viewed from above, wherein the first through fourth resonators are configured to generate a transmission zero, and wherein the first resonator, the second resonator and the fourth resonator are configured to resonate within a passband of the filter, while the third resonator is configured to resonate outside the passband of the filter.

17. The filter of claim 16, further comprising:

a first transmission line section that connects the first resonator to the second resonator and the second resonator to the fourth resonator; and a second transmission line section that connects the first resonator to the third resonator and the third resonator to the fourth resonator.

18. The filter of claim 17, wherein the first and second transmission line sections form a closed structure when viewed from above.

19. The filter of claim 18, wherein the third resonator is configured to resonate below the passband of the filter.

20. The filter of claim 17, wherein a magnitude of a first coupling between the first resonant cavity and the third resonant cavity is at least twice a magnitude of a second coupling between the third resonant cavity and the fourth resonant cavity.

* * * * *